United States Patent [19]

Ward et al.

[11] 4,259,034
[45] Mar. 31, 1981

[54] BALE HANDLING APPARATUS

[76] Inventors: Kent G. McB. Ward, General Delivery, Olds, Alberta, Canada; Francis L. Smith, 1024 Cannock Pl. SW., Calgary, Alberta, Canada, T2M 1M7

[21] Appl. No.: 3,859

[22] Filed: Jan. 16, 1979

[51] Int. Cl.³ .................. A01D 87/12; B60P 1/16
[52] U.S. Cl. .................. 414/24.6; 414/38; 414/486; 414/501; 414/555
[58] Field of Search .......... 414/38, 39, 44, 111, 414/469, 486, 501, 546, 550, 551, 552, 553, 911, 24.5, 24.6, 555

[56] References Cited

U.S. PATENT DOCUMENTS

| 2,696,924 | 12/1954 | Madsen | 414/552 |
|---|---|---|---|
| 3,373,882 | 3/1968 | Forest | 414/44 X |
| 3,749,268 | 7/1973 | Macomber et al. | 414/501 X |
| 3,820,673 | 6/1974 | McVaugh | 414/911 X |
| 3,896,956 | 7/1975 | Hostetler | 414/911 X |
| 3,897,880 | 8/1975 | Waske et al. | 414/24.5 |
| 3,902,612 | 9/1975 | Hall | 414/911 X |
| 3,908,846 | 9/1975 | Brummitt | 414/26.6 |
| 3,942,666 | 3/1976 | Pfremmer | 414/501 |
| 3,968,940 | 7/1976 | Godbersen | 414/911 X |
| 4,037,741 | 7/1977 | Smith | 414/911 X |
| 4,056,204 | 11/1977 | Spasuik | 414/551 X |
| 4,084,707 | 4/1978 | McFarland | 414/911 X |
| 4,088,272 | 5/1978 | Grillot | 241/30 |
| 4,117,940 | 10/1978 | Adam | 414/24.5 |
| 4,138,159 | 2/1979 | Hall | 414/911 X |

FOREIGN PATENT DOCUMENTS

| 980731 | 12/1975 | Canada . | |
| 1011297 | 5/1977 | Canada | 414/24.6 |
| 2337496 | of 1977 | France . | |

Primary Examiner—Leslie J. Paperner
Attorney, Agent, or Firm—Larson, Taylor and Hinds

[57] ABSTRACT

Bale handling apparatus is disclosed which in one embodiment is capable of self-loading a plurality of, for example, four large round hay bales, transporting the hay bales, stacking the hay bales, loading a stack of hay bales for transporting to another area, and unrolling a hay bale. The apparatus comprising a frame, a chassis for movably supporting the frame over the ground, and a bale engaging assembly for releasably engaging a bale at the ends thereof and for loading the engaged bale onto the frame at one side of one end thereof. A transversely movable carriage can move such a bale to the other side of the frame to make room for a further bale on the one side. The frame is pivotably mounted to the chassis at the other end thereof and can be tilted with respect thereto so that bales which have been loaded onto one end of the frame can be displaced rearwardly so as to make room for loading of additional bales. In addition, the frame can be rotated by position of approximately 90° with respect to the chassis so that a stack of bales can be made.

15 Claims, 26 Drawing Figures

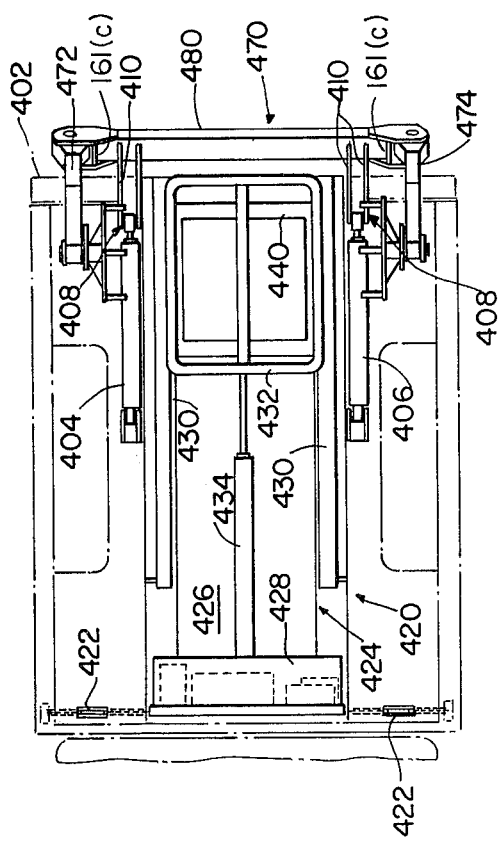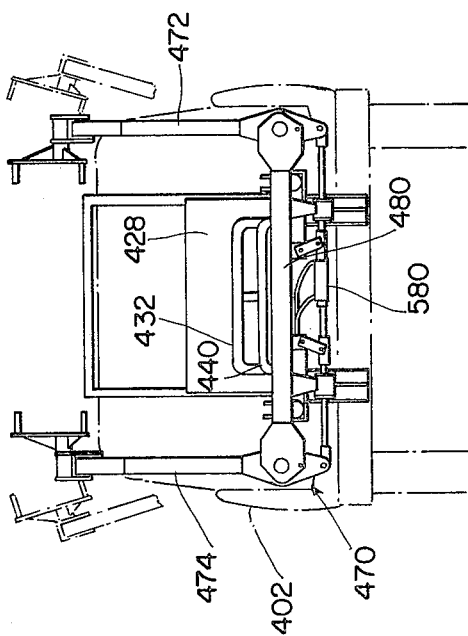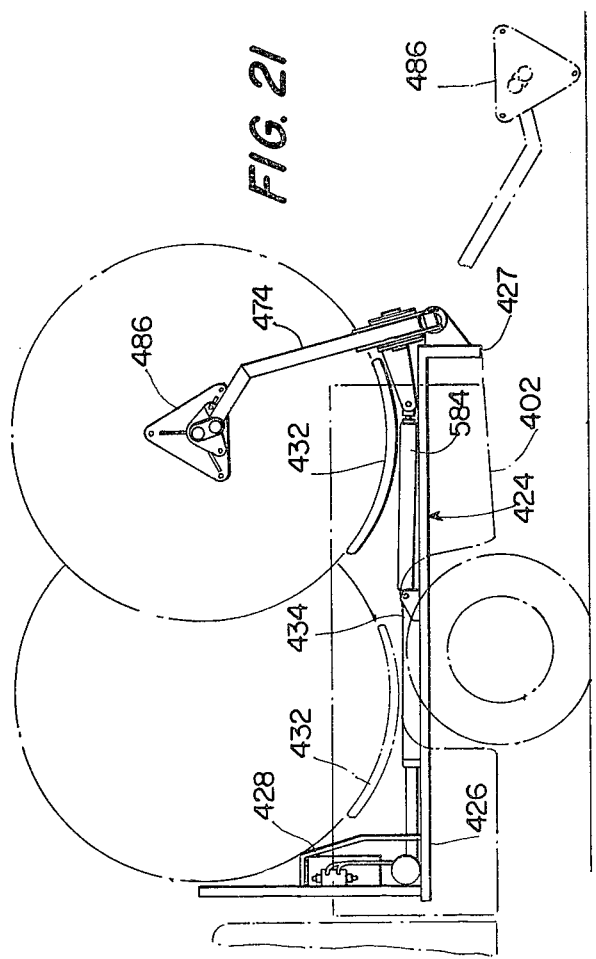

BALE HANDLING APPARATUS

FIELD OF THE INVENTION

The present invention relates to article handling apparatus and more particularly relates to apparatus for handling bales such as large round hay bales.

BACKGROUND OF THE INVENTION

Heavy and bulky article handling equipment has usually been designed only with respect to the particular type of article and to handle the article in a very limited way. Thus, there is one piece of equipment to pick up individual articles, a second piece of equipment to transport a plurality of articles, a third piece of equipment to unload the articles from the transporter, and a fourth piece of equipment to stack the articles. This is generally the case for equipment designed to handle the modern large round hay bales. Whereas the conventional box-shaped hay bale was relatively small and weighed less than 50 lbs., the round hay bale is made with a diameter of 5 or 6 feet and commonly weights between 600 and 3,000 lbs., depending upon material density and moisture content, and is approximately 5 feet long.

Commercial farm equipment exists in which the large round hay bales are wound in situ at the same time the hay is being harvested. Modern farming techniques call for the baler to follow or be part of the hay harvesting equipment and to form the large hay bales and deposit them in a plurality of rows. The hay bales are then collected, usually by a forklift, and deposited on a transporting piece of equipment. After the bales have been taken to the storage location, another piece of equipment is usually required to unload the transporter and yet another piece of equipment is required to stack the hay bales. Finally, still another piece of apparatus is usually used for unrolling the hay bales and distributing the hay to livestock, such as cattle.

Prior art devices for lifting, transporting, stacking, unrolling, or otherwise handling the large round hay bales are disclosed in the following patents: U.S. Pat. Adam, No. 4,117,940 which discloses a side self-loading, rear self-discharging trailer for transporting a number of round hay bales; Grillot, No. 4,088,272 which discloses a bale self-loader and shredder; McFarland, No. 4,084,707 which discloses a round bale, self-loading, transporting, and unrolling machine; Smith, No. 4,037,741 which discloses a bale loading and transporting apparatus having a feed rack structure for allowing livestock to feed on the bales; Godberson, No. 3,968,940 which discloses apparatus mountable on a three-point hitch of a trailer for engaging, lifting, transporting, and unwinding a single round bale of hay; Brummit, No. 3,908,846, which discloses a large round bale handling apparatus mountable on a three-point hitch of a tractor for engaging, lifting, transporting, and unwinding a single round hay bale; Waske et al, No. 3,897,880 and Hostetler, No. 3,896,956, each of which discloses a device mountable on a pick-up truck for engaging, lifting, and transporting a single bale of hay. In addition, French Pat. No. 2,337,496 and Canadian Pat. No. 980,731 disclose further devices mountable on a three-point hitch of a tractor for handling round hay bales. Finally, U.S. Pat. No. 3,902,612 to Hall and No. 3,820,673 to McVaugh disclose specially designed trucks for loading and transporting cable reels.

A study of the devices depicted in the aforedescribed patents and of some commercially available machines reveals several deficiencies. Although some of these machines perform a number of functions regarding the handling of hay bales, none of the machines combine into one apparatus the feature of self-loading; the ability to load in the hay baler path; the ability to transport and unload the hay bales; the ability to stack the hay bales; the ability to retrieve hay bales arranged in a line; and the ability to unwind the hay bales. In addition, several of the devices employing chain conveyers for bale movement cause damage to the hay and the twine as the hay bales are being handled. In addition, may serious accidents have occurred through improper use of those machines employing a front end loader and many of the self-feeding systems result in a large amount of hay wastage and excessive intake as well as significant losses in transporting of the bales.

SUMMARY OF THE INVENTION

The present invention overcomes the foregoing and other deficiencies of the prior art devices and provides a machine for automatically loading, stacking and retrieving large articles. If the articles are large round hay bales, the present invention is also capable of unrolling and feeding the hay. It is also a function and advantage of the present invention that all of the foregoing functions are capable of being performed by a single, relatively inexpensive, remarkably sturdy machine. In one particular embodiment of the present invention, a trailer-type machine using hydraulic and/or electrical motive forces is easily attachable to be pulled by any self-propelled vehicle such as a tractor or a pick-up truck, and the hydraulics and electrical connections are easily connected to the pulling vehicle.

The present invention, when used with large round hay bales, is capable of loading at least four bales placed in a line in the field while following the path of the hay baler and is capable of safely transporting the bales to a storage area and stacking them on end in a two or three high stack. A stack of at least four bales can be retrieved at a time and loaded onto the present apparatus for transportation to the animal feed area where the bales can be unrolled one at a time. With the present invention, the hay bales are easily and efficiently handled with a minimum of damage to the hay bale and a minimum of hay loss.

In one aspect of the present invention, a bale handling apparatus comprises an elongate main frame having front and rear ends and which is capable of holding a plurality of articles or bales and a means for movably supporting the frame for movement over the ground. The apparatus also has bale engaging means for releasably engaging a bale and for loading and unloading the engaged bale respectively onto and off the frame from one end thereof, and a tilting means having a transverse axis of rotation for tilting the frame with respect to the supporting means about the transverse axis such that a bale loaded onto one end of the frame can be slid to the other end of the frame in order for a second bale to be loaded onto the frame at the first end.

In another aspect of the present invention, consideration is given to the limited hydraulic capability of the conventional farm equipment. A conventional farm tractor has a maximum number of external hydraulic functions which it can support, typically four for a farm tractor having a dual hydraulic system. Therefore, it is a further object of the present invention to provide a multi-function bale handling apparatus which limits the total number of hydraulically operated implements to a minimum. In one aspect of the invention, the bale handling apparatus uses four hydraulic actuators to perform six functions, namely: a first hydraulic actuator to open and close two bale grasping arms, a second hydraulic actuator to transversely move a loaded bale from one side of the frame to the other side of the frame, a third hydraulic actuator to move a previously loaded bale from one end of the frame to the other end of the frame, and finally a fourth hydraulic actuator which, in combination with a cam and cam follower and a radius arm performs the compound functions of lowering and lifting the bale engaging arms adjacent a bale which is situated on the ground, of swinging or pivoting the bale engaging arms from a position along side the frame to a position parallel to the frame while raising the bale engaging arms to a position above the frame so that a bale can be placed thereon.

A further aspect of the present invention is directed to a bale handling apparatus which comprises an elongate frame having front and rear ends and capable of holding a plurality of longitudinally arranged bales and means for movably supporting the frame over the ground. The bale handling apparatus further comprises bale engaging means for releasably engaging a bale wherein the bale engaging means comprises a support member, means for pivotably mounting the support member to the frame for substantially horizontal pivotal movement, about a generally vertical axis, and means for pivoting the support member horizontally and rotating the support member vertically about a horizontal axis. The pivoting and rotating means further comprises a hydraulic motor means and a cam assembly such that through actuation of just the hydraulic means, the support member is both pivotably swung and rotated.

In another aspect of the present invention, the number of hydraulic actuators is minimized as a result of the hydraulic actuator which operates the grasping movement of the arms of the bale engaging means being aligned along the horizontal, pivotal axis of the bale engaging means. This aspect of the invention is particularly useful for a bale handling apparatus which is removably mountable in the bed of a conventional half-ton or three-quarter ton pick-up truck. In this aspect of the present invention, the bale handling apparatus comprises an elongate frame having front and rear ends and capable of holding a plurality of longitudinally arranged bales, bale engaging means pivotably mounted on the frame for releasably engaging a bale and for loading and unloading the engaged bale respectively onto and off the frame at one end thereof, and means for moving a first loaded bale from said one end of the frame to the other end of the frame. The bale engaging means includes a substantially horizontally extending member and two arms pivotably attached near respective ends thereof to the corresponding ends of the support member. A single fluid actuating means for simultaneously pivoting the two arms is connected between the respective terminal ends of the arms and extends through the pivotal axis of the support member.

In a further aspect of the invention, a bale handling apparatus comprises an elongate, mobile trailer having a frame and a means for movably supporting the trailer over the ground. The apparatus also has a tiltable bed mounted to the frame, the bed being capable of supporting a plurality of bales oriented in one direction. Means are provided for pivotably mounting the bed to the frame for tilting about an axis generally perpendicular to the firstmentioned direction. Means are additionally provided for tilting the bed about the second axis such that the oriented bales are unloaded from the trailer in a vertical stacked arrangement onto a supporting surface such as the ground.

The foregoing and other objects, features and advantages of the present invention are discussed in or are apparent from the description and drawings of the presently preferred embodiments of the invention found hereinbelow.

BRIEF DESCRIPTION OF THE DRAWINGS

FIG. 20 is a plan view, taken from a scaled blueprint, of another embodiment of the present invention in which the bale handling apparatus is shown positioned in the bed of a pick-up truck.

FIG. 21 is a side elevational view, taken from a scaled blueprint, of the embodiment of the invention depicted in FIG. 20.

FIG. 22 is an end elevational view, taken from a scaled blueprint, of the embodiment of the invention depicted in FIG. 20.

DETAILED DESCRIPTION OF THE PREFERRED EMBODIMENT

Figure 1:
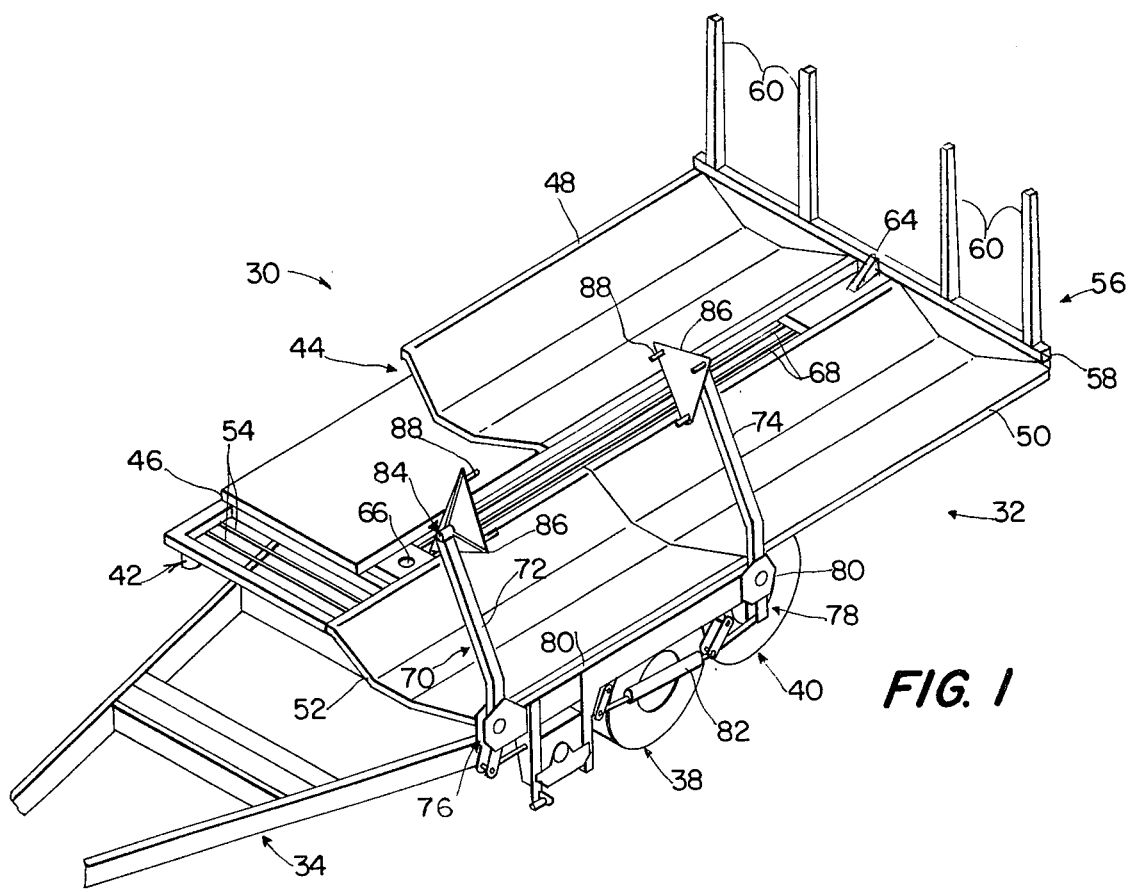
FIG. 1 is a perspective view taken from a photograph of a prototype according to one embodiment of the present invention adapted for the handling of large cylindrical bales and which is embodied in a powerless, trailer-type vehicle.

With references now to the drawings in which like numerals represent like elements through the several views, and in particular with reference to FIG. 1, a bale handling apparatus according to the present invention in the embodiment of a non-powered trailer 30 is depicted. Trailer 30 is comprised of a carriage assembly 32 and a yoke assembly 34 designed to be attached to a self-propelled vehicle, such as a conventional farm tractor (not shown) which has a conventional dual hydraulic system. Carriage assembly 32 is comprised of a wheeled base assembly 36 having two, two-wheeled transverse axle assemblies 38 and 40 and an elongate base frame 42, and a bale support platform 44 pivotally mounted at the rearward portion thereof to base assembly 36.

Bale support platform 44 includes a support bed 46, and two transversely arranged, rearwardly disposed bale pans 48 and 50 which are spaced apart and fixedly mounted to the rearward half of support bed 46. A forward bale pan 52 is mounted for transverse movement on support bed 46 with a conventional hydraulically operated orbit motor (not shown) and roller chains 54. Forward bale pan 52 is movable by the orbit motor and roller chains 54 between a first position in which it is in longitudinal alignment with the right rear bale pan 50 and a second position in which it is in longitudinal alignment with left rear bale pan 48. All three bale pans 48, 50 and 52 have a shallow, flat bottomed U-shaped transverse cross section and open ends, and can be made from thick sheet metal.

Longitudinally movably mounted to support bed 46 and shown in the rearward position is a fork assembly 56 comprised of a base member 58 and four tines 60 rigidly mounted to base member 58 and disposed substantially perpendicular thereto. Base member 58 is rigidly attached to a longitudinally movable trolley 64 depicted at a rearward position and movable therefrom to approximately the transverse midline of support bed 46 by a conventional hydraulically operated orbit motor 66 and roller chains 68.

Pivotably mounted to the forward right hand corner of base frame 42 is a bale engaging means 70 depicted in FIG. 1 in the longitudinally extending or transport position. Bale engaging means 70 is comprised of two, spaced apart bale grasping arms 72 and 74 pivotably mounted near corresponding proximal end portions 76 and 78 to corresponding ends of a support beam 80, and a hydraulic cylinder 82 connected between proximal end portions 76 and 78 of arms 72 and 74. Rotatably mounted to the distal ends of arms 72 and 74 through a swinging link assembly 84 are triangularly shaped, bale grasping plates 86 having inwardly projecting spikes 88 mounted on the inwardly facing surfaces thereof.

For exemplary purposes only, the specifications for the prototype trailer 30 depicted in FIG. 1 can include an overall length of 19 feet 4 inches and an overall empty width of 11 feet. A trailer made of all metal construction would weigh empty a little less than two and a half tons and would be capable of supporting four, two thousand pound round hay bales.

With reference now to FIGS. 2-6, a slightly modified trailer according to the present invention, with parts removed for clarity, is depicted. The detailed description of the components of a presently preferred embodiment of the present invention will be given with respect to a slightly modified trailer 30' depicted in these figures. However, for the sake of convenience, the same numerals will be used to identify the various components as were used in FIG. 1.

Figure 2:
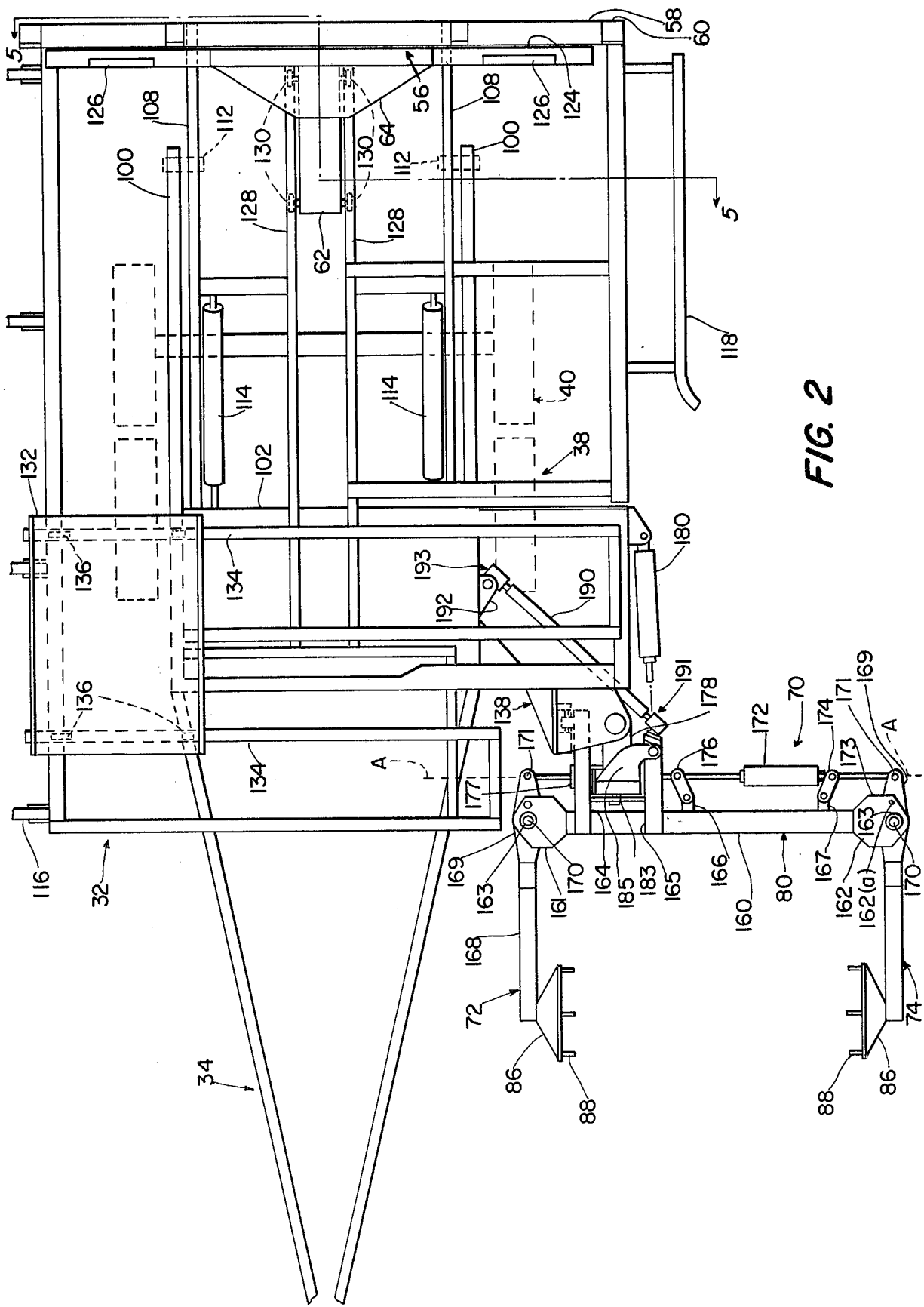
FIG. 2 is a plan view, with parts removed, taken from a scaled blueprint of a slightly different trailer-type, round hay bale handling apparatus than that shown in FIG. 1.
Figure 3:
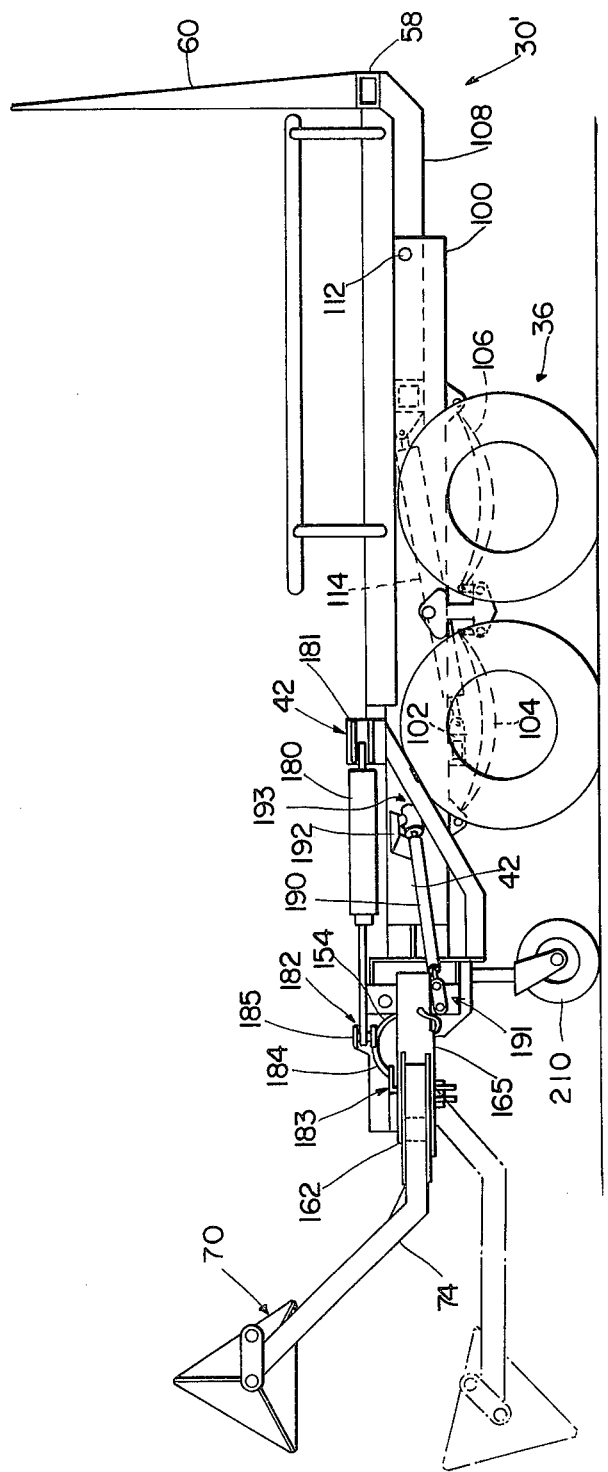
FIG. 3 is a side elevational view taken from a scaled blueprint of the hay bale handling apparatus depicted in FIG. 2.
Figure 5:
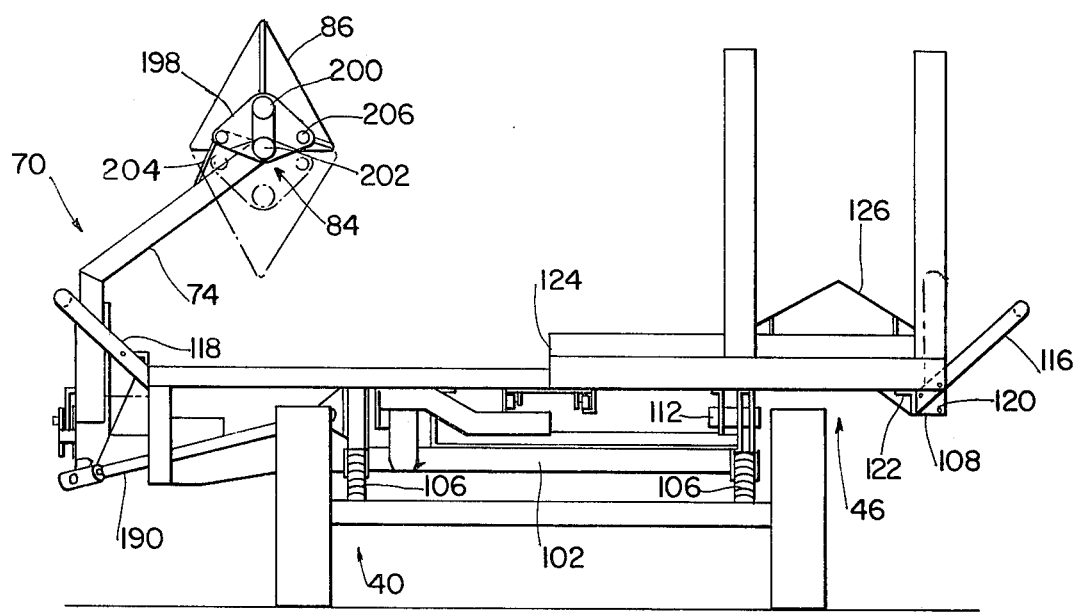
FIG. 5 is an end elevational view, partly in cross-section taken along line 5—5 of FIG. 2.
Figure 6:
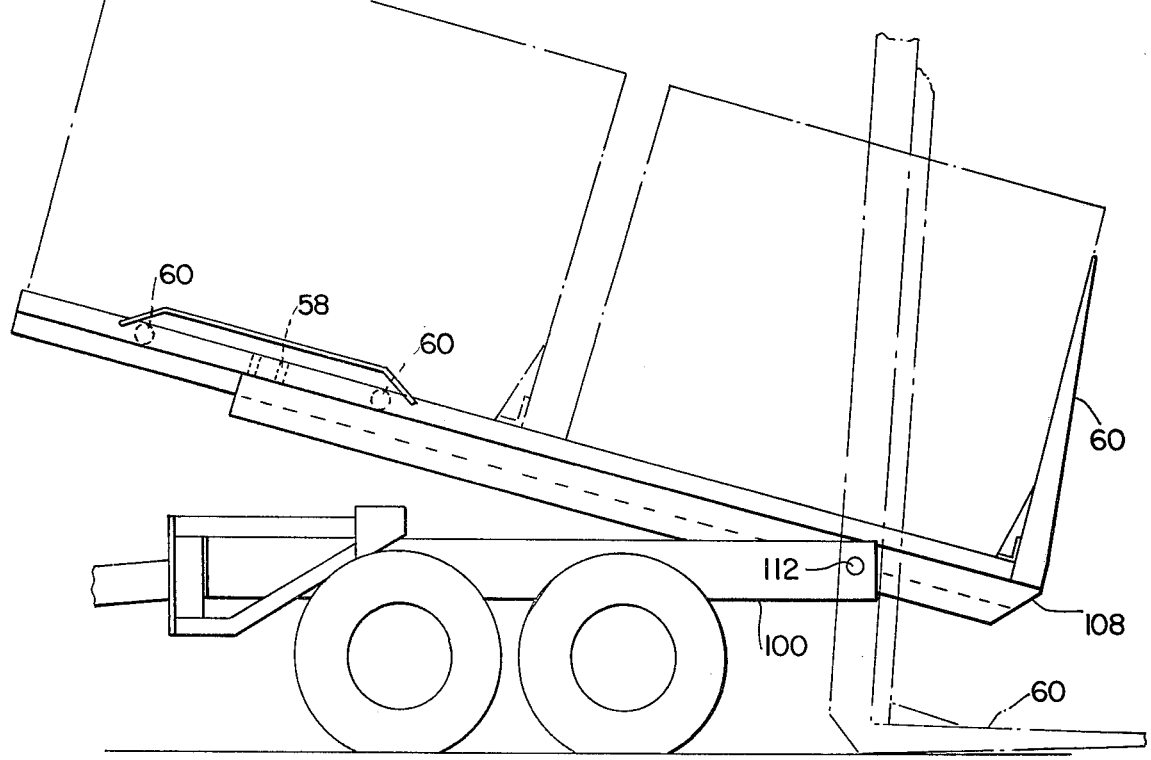
FIG. 6 is a side elevational view, with parts removed, taken from a scaled blueprint, depicting the trailer bed in a tilted position.
Figure 7:
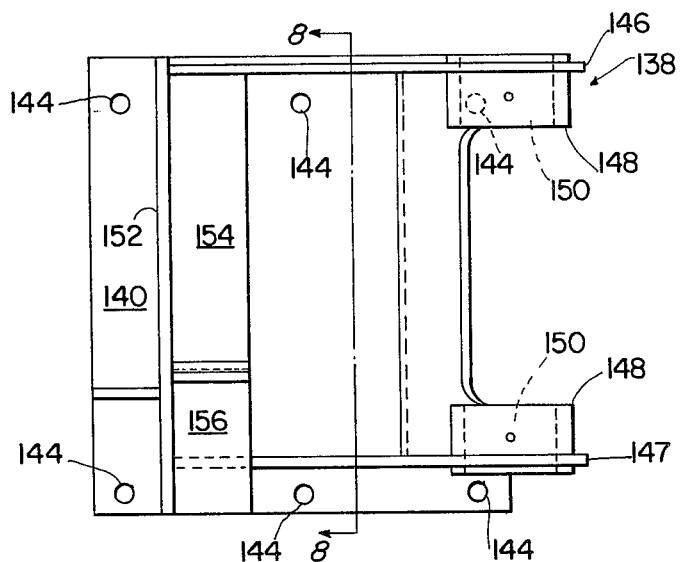
FIG. 7 is a side elevational view, taken from a scaled blueprint, of a box swivel assembly which contains a cam for causing the initial rotation about about a horizontal axis of the arms of the bale engaging means during lifting of a bale.
Figure 8:
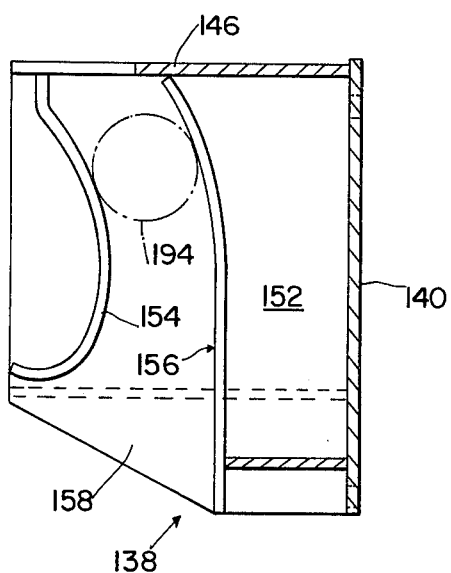
FIG. 8 is a cross-sectional view, taken from a scaled blueprint, taken along lines 8—8 of FIGS. 7 and 9.
Figure 9:
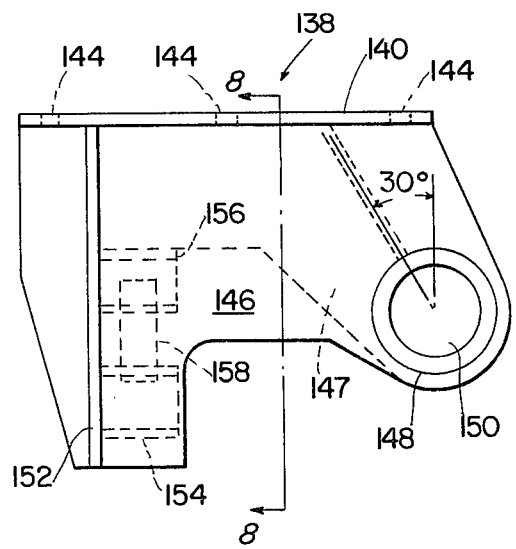
FIG. 9 is a top plan view, taken from a scaled blueprint, of the box swivel assembly shown in FIG. 7.

As is clearly shown in FIGS. 2, 3 and 5, base frame 42 of wheeled base assembly 36 is comprised essentially of a plurality of spaced apart longitudinal, channel-shaped beams 100 and a plurality of transverse, channel-shaped beams 102, and is mounted from axle assemblies 38 and 40 with transversely spaced leaf springs 104 and 106. Likewise, support platform 44 is comprised of a crisscross pattern of longitudinal beams 108 and transverse beams 110 and is pivotally connected to base frame 42 with a a pair of spaced apart, axially aligned axles 112. A pair of tilting hydraulic cylinders 114 are transversely spaced apart and connected at their corresponding forward ends to a base frame transverse beam 102 and connected at their corresponding rear ends to a support platform transverse beam 110. Extension of hydraulic cylinders 114 results in the tilting of support platform 44 about axles 112. Axles 112 and the positioning and extension length of tilting cylinders 114 are selected such that the support platform can be rotated through an angle of approximately 95° such that the bottoms of tines 60 engage the ground as shown in dashed lines in FIG. 6. Pivotably mounted to the sides of support bed 46 and extending upwardly and outwardly therefrom are a long guide rail 116 and a short guide rail 118. When not needed, guide rails 116 and 118 can be rotated to a substantially vertical position and locked in place to a longitudinal beam 108 with a lock bolt 120 (see FIG. 5). Guide rails 116 and 118 are retained in their operational positions by the engagement of the terminal ends thereof with corresponding angle irons 122.

With particular reference to FIG. 2, it can be seen that fork assembly 56 is fixedly attached to the rear end of support bed 44 and that trolley 62 is connected through brace member 64 to a further transversely extending base member 124 having upstanding plates 126 rigidly mounted to corresponding end portions of base member 124. Longitudinal trolley 62 is mounted in two parallel, spaced apart rails 128 with four tapered rollers 130. As mentioned above, trolley 62 is moved along rail 128 with an orbit motor and roller chain assembly (not shown in FIG. 2).

Also shown in FIG. 2 is a lateral trolley 132 generally rollably mounted on two parallel, spaced apart and laterally extending rails 134 with four tapered rollers 136. Also mentioned above, lateral trolley 132 is positioned with an orbit hydraulic motor and roller chain assembly. Forward bale pan 52 is removably mounted onto lateral trolley 132 and is used for transversely positioning a round hay bale. Longitudinal trolley 62 is used for moving two rearwardly located round hay bales to a forward position through the engagement of plates 126 with the hay bales.

With reference now to FIGS. 2–5 and 7–10, the unique mounting means for mounting the bale engaging means 70 to base frame 42 will now be described in greater detail. A box swivel assembly 138 having a rear mounting plate 140 is rigidly attached to a base frame transverse beam 102 with mounting means such as bolts 142 extending through orifices 144 of mounting plate 140. Box swivel assembly 138 includes top and bottom, vertically spaced apart bearing plates 146 and 147 having coaxially aligned bearing cups 148 with orifices 140 located at the outward side thereof. Box swivel assembly 138 further comprises an inward side 152 which extends vertically between top and bottom bearing plates 146 and 147. The remaining front and outward side of box swivel assembly 138 is open. Mounted to the forward portion of side 152 are forward and rearward curved cam plates 154 and 156 forming a vertical camming channel 158 therebetween. Top bearing plate 146 is larger than and extends more forwardly than bottom bearing plate 147 such that top bearing plate forms a top cover over camming channel 158 and the bottom of camming channel 148 is left open.

Figure 4:
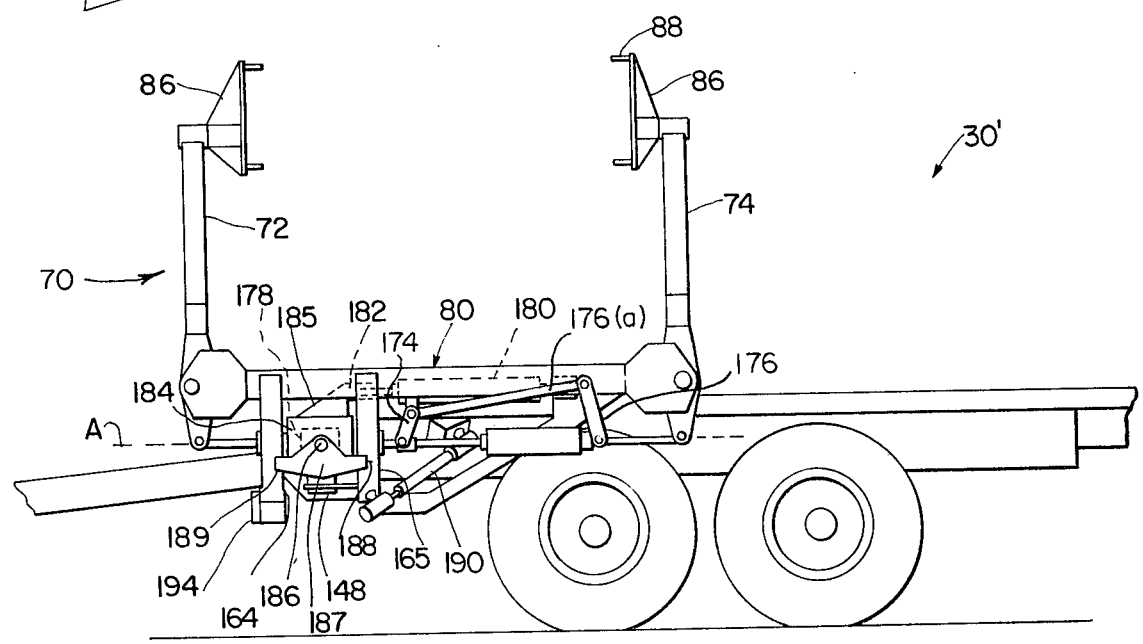
FIG. 4 is a side elevational view, similar to FIG. 3, taken from a scaled blueprint, but with the bale engaging means retracted to the trailer loading position.

With particular reference to FIGS. 2 and 4, as described hereinbefore, bale engaging means 70 is comprised of a support beam 80 and two grasping arms 72 and 74. It is noted for the sake of convention that the inward and outward directions and the forward and rearward directions are as shown in plan in FIG. 2 and are with respect to carriage assembly 32.

Figure 10:
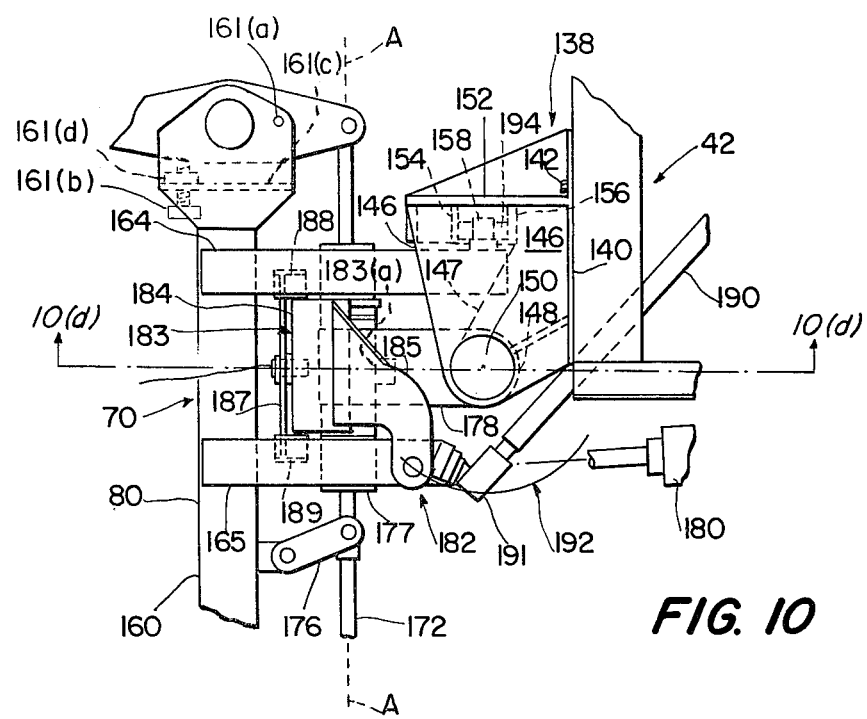
FIG. 10 is an enlarged view, taken from a scaled blueprint, of the circled area of FIG. 2 showing the cooperation between the cam and roller cam follower and the pivot points and motion control strut of the bale engaging assembly.
Figure 12:
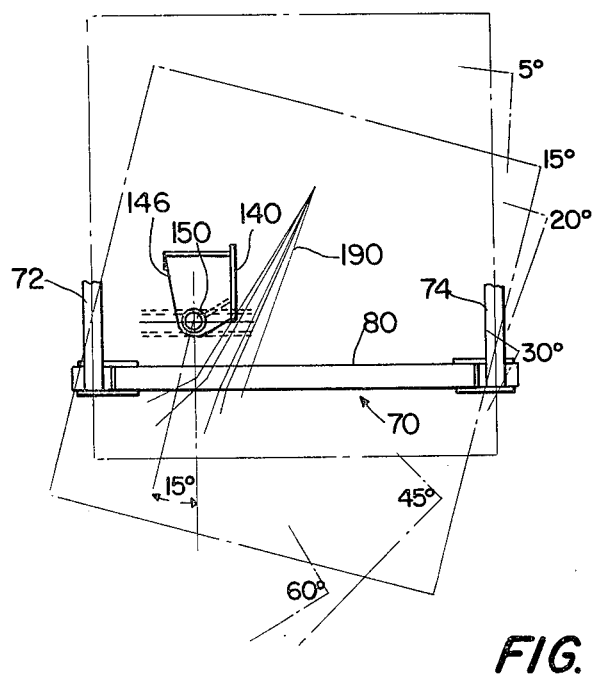
FIG. 12 is a plan view showing the pivoting of the bale engaging assembly and an engaged bale depicted in dash lines as the bale is rotated through sixty of the ninety degrees it is moved as it is being off loaded from the bed of the carriage assembly.
Figure 10A:
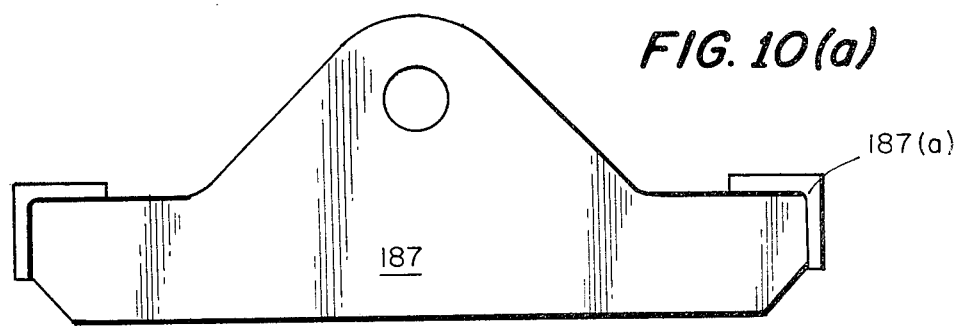
FIG. 10(a) is an enlarged detail view, taken from a scaled blueprint, of the bar-lifting equalizer shown in FIG. 10.
Figure 10B:
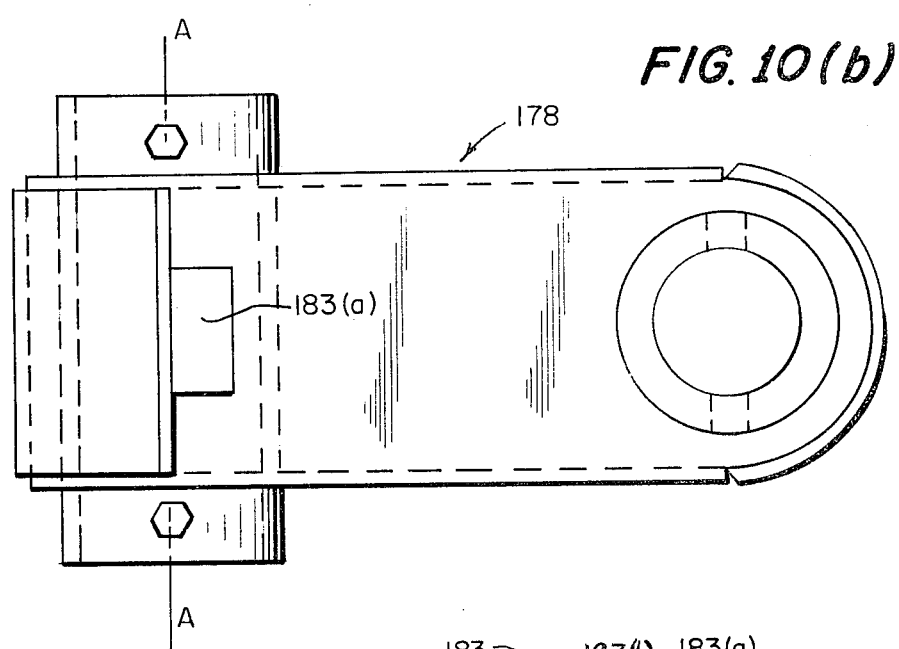
FIG. 10(b) is an enlarged detail view taken from a scaled blueprint, of the trunnion shown in FIG. 10.

As shown in FIG. 10, a stop bolt 161 (b) is provided to enable adjustment of the bale grasping arms. Bolt 161(b) is attached to extend through plate 161(c), FIGS. 10 and 20, and extension of the bolt through lock-nut 161(d) determines the degree of adjustment.

Referring particularly to FIG. 2 support beam 80 more particularly includes a horizontally extending, hollow frame member 160 having a square cross-section and two generally H-shaped journal boxes 161 and 162 rigidly mounted to each end thereof. Journal boxes 161 and 162 each has an aligned bore 163 extending completely through the distal end of each side thereof. As shown more clearly in FIGS. 2 and 10, locking pin bores 161(a) and 162(a) respectively are provided to accommodate pins (not shown) which may be introduced to secure either of grasping arms 72 and 74 in a fixed position so that the fixed arm can penetrate between two adjacent bales while the free, unpinned arm will move to grasp the appropriate bale. Perpendicularly, rigidly mounted near one end of frame member 160, and extending in the opposite direction of bale grasping arms 72 and 74, are two parallelly extending connecting members or support arms, an inwardly disposed connecting member 164 and an outwardly disposed connecting member 165. At the midportion of each connecting member are two coaxially aligned bores which define a horizontal axis of rotation A of bale engaging means 70. Also rigidly mounted to the same side of frame member, but located between outward connecting member 165 and journal box 162, are two brackets 166 and 167. Each grasping arm is comprised of an angular shank portion 168 made from a square metal tube and having a vertical bore (not shown) at the proximal end thereof, grasping plate 86 pivotably attached to the distal end at the inside face thereof, as described more fully hereinabove, and two journal plates 169 rigidly mounted at one end thereof to the other end of shank portion 168 along the top and bottom thereof so as to extend coaxially therebeyond. As depicted in FIG. 2, journal plates 168 are pivotably mounted inside the extending sides of the corresponding frame member journal box 161 or 162 with a pivot pin 170 which also extends through the journal box bore 163 in the proximal end of shank portion 168. At the free end of each journal plate 168 are coaxially, vertically aligned bores 171 for receiving the connecting linkage of a hydraulic motor means such as a hydraulic cylinder 172. Bores 171 are also vertically positioned on either side of horizontal axis of rotation A.

Hydraulic cylinder 172 is comprised of a double acting piston and cylinder arrangement with outwardly extending, articulated linkage comprised of an outward shaft 173 and an inward shaft 174. Outward shaft 173 is pivotably connected at the outward end thereof to bore 171 at the end of arm 74, and at the inward end thereof to the end of cylinder 172 and a pivotal support link 175, the other end of which is pivotably connected to outer bracket 167. Inward shaft 174 is pivotably connected at the inward end thereof to bore 171 at the end of arm 72, extends through the coaxially aligned bores in connecting member 164 and 165 and is pivotably connected at the outward end thereof to the piston tail of cylinder 172 and a pivotal support link 176, the other end of which is pivotably connected to inner bracket 166. Thus it can be seen that as cylinder 172 contracts, the rearward ends of arms 72 and 74 are pulled toward each other, thereby opening the outer ends thereof so as to permit a bale to be disposed therebetween. Extension of cylinder 172 reverses the sequence and permits the spikes 88 of bale grasping plates 86 to be forced into the bale as the bale is grasped by arms 72 and 74. It may however be necessary, as shown only in FIG. 4, to introduce a synchronizing link 176(A) between support links 174 and 176, the effect of this would be to ensure that arms 72 and 74 will move in an equalized manner during opening and closing.

Figure 10D:
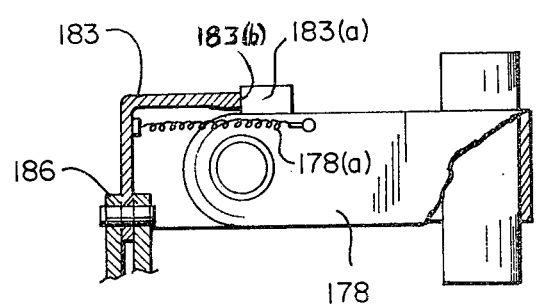
FIG. 10(d) is a detail section taken on line B—B of FIG. 10 with some parts removed for clarity.
Figure 10C:
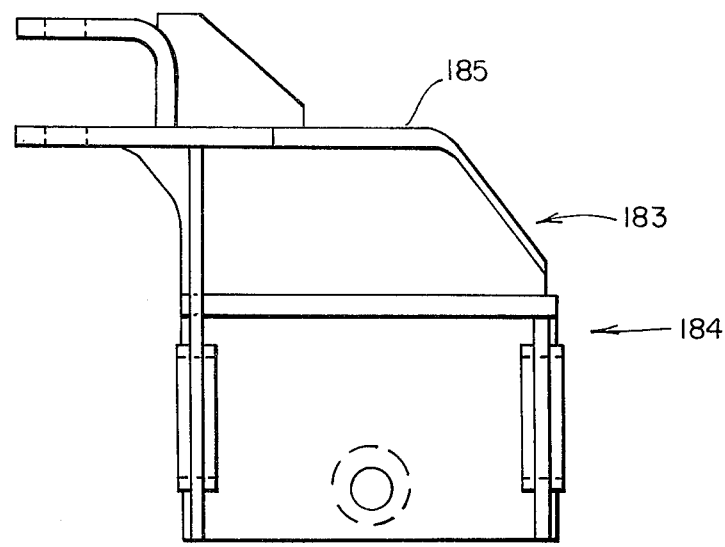
FIG. 10(c) is an enlarged detail view taken from a scaled blueprint, of the bracket and lever hinge shown in FIG. 10.
Figure 11:
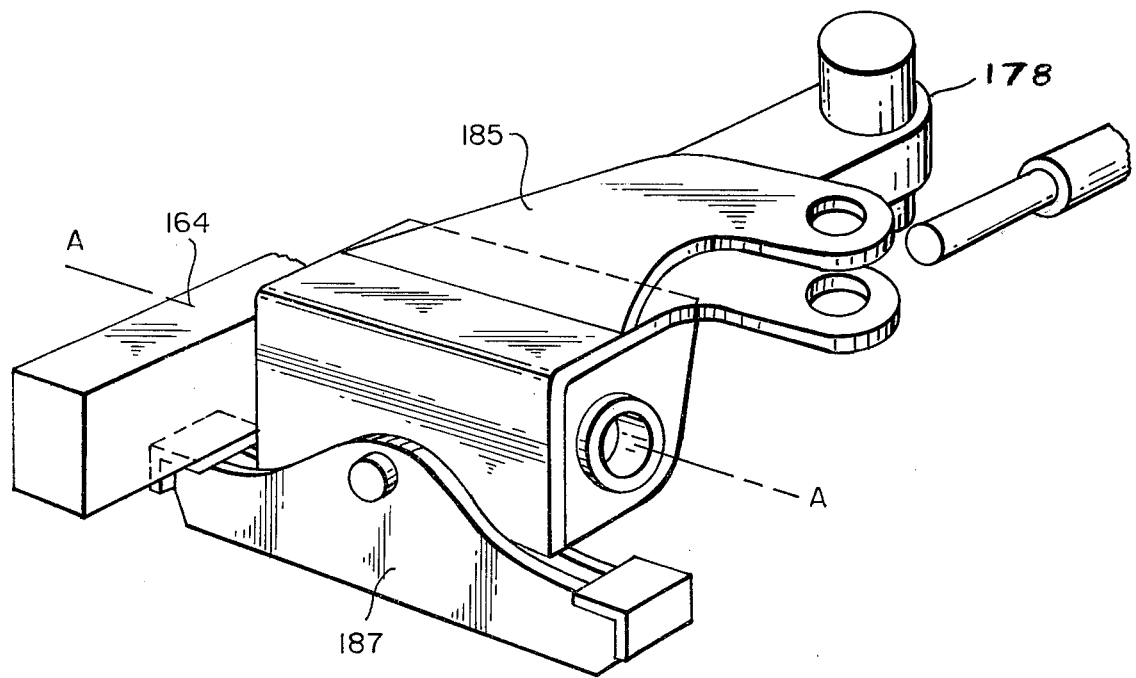
FIG. 11 is a perspective view depicting the assembly of the components according to FIGS. 10(a)–10(c), with some co-operating parts shown in phantom outline to provide co-relation with FIGS. 10 and 10(d).

With reference now in particular to FIGS. 10–10(d), and also FIGS. 3 and 4, the means for vertically and horizontally pivoting the bale grasping means will now be described. Extending through both bores of connecting members 164 and 165 and rigidly attached thereto is a bearing sleeve 177. Journalled around bearing sleeve 176 is one end of the trunnion 178. The other end of trunnion 178, in turn, is rotatably mounted in bearing cups 118 of box swivel assembly 138 for rotation about a vertical axis at the centre of bore 150. Thus, a support beam 80 of bale engaging means 70 is pivotably mounted to base frame 42 at the forward right hand corner thereof (as seen in FIG. 2) through trunnion 178 and box swivel assembly 138. Trunnion 178 in one embodiment is comprised of a steel tube having a first short pipe extending through one end and a second short pipe extending through the other end in a direction perpendicular to the first pipe so that one end of trunnion 178 can be rotated about horizontal axis A and the other end can be rotated about a vertical axis in box swivel assembly 138. An exemplary distance between the axes in the trunnion end pipes is 9 inches with one short pipe being 7¼ inches long and the other one being 8¾ inches long.

Horizontal swinging movement of bale engaging means 70 is caused by the extension of a single hydraulic cylinder 180, one end of which is pivotably attached to base frame 42 at brackets 181, and the other end of which is universally journalled with a ball and socket connection 182 to a lever-hinge bracket 183. Lever-hinge bracket 183 has a box-shaped housing 184 with an open bottom and spaced apart coaxially aligned bearing cups 185 in either side for being pivotably mounted around bearing sleeve 177 on either side of trunnion 178. Angularly extending from the top of housing 184 is a lever portion 185, the distal end of which receives ball and socket connection 182. At the lower portion of the back of housing 184, just below horizontal pivot axis A is an orifice through which a bolt 186 mounts a substantially triangularly-shaped guide plate 187 at the upper vertex thereof (as shown in FIG. 4) to lever-hinge bracket 183. The lower two vertices of guide plate 187 are enlarged into bosses 188 and 189 which can selectively engage the underside portions of inwardly connecting member 164 and outwardly connecting member 165 as bale engaging means 70 is swung, thereby causing vertical pivoting of arms 74 and 76 into the first lifting phase of the operation, as support beam 80 is rotated.

Thus, looking specifically at FIG. 10 (d), when the inner edge 183(b) of the lever hinge bracket 183 contacts stop block 183(a), which is in this embodiment fixedly attached as by welding to trunnion 178, this essentially commences the rotation phase, edge 183(b) and the block 183(a) remaining in contact while the cylinder 180 is under load. It may however be necessary, as shown schematically in FIG. 10(d) to provide one or more springs 178(a) operably extending between trunnion 178 and bracket 183. Such springs would ensure that the edge 183(b) and the block 183(a) remain substantially in contact during the upward and downward operating nodes. As will be apparent, when lowering in the vertical phase, bracket 183 moves away from block 183(a), the cylinder 180 is then acting on bracket 183 which at this instance can be considered as a free floating lever which may not without springs 178(a) cause the arms 72 and 74 on their supporting beam 80 to move downwardly in unison therewith.

Support beam 80 is also connected to base frame 42 through a strut 190 that is attached at one end through a heavy duty ball and socket joint 191 to the distal, rearward end of outward connection member 165 and that is pivotably attached at the other end to a flange 192 on frame 42 through a second heavy duty ball and socket joint 192. The fourth and last connection between base frame 42 and support beam 80 is a cam follower or roller 194 that is rotatably mounted to the distal, rearward end of inward connection member 164 (as best seen in FIG. 4) and the engagement thereof into and in camming channel 158 as bale engaging means is swung to its outward position (clockwise in FIG. 10).

The interactions among cam follower 194 and cam plates 154 and 156, strut 190, guide plate 187 and lever-hinge bracket 183, and cylinder 180 is as follows. When bale engaging means 70 (see FIG. 4) is in its rearward loading position, bale engaging arms 72 and 74 are in a substantially vertical position with bale grasping plates inclined over support bed 46 (FIGS. 1 and 5), cylinder 180 is contracted and cam follower 194 is disengaged from camming channel 158. As soon as cylinder 180 begins to expand, the force is applied to support beam 80 at the horizontal plane of rotation axis A through lever-hinge bracket 183, which is above the lower pivotal connection of strut 190 (FIGS. 4 and 5). The restrictive action of strut 190 results in a counter clockwise moment (as seen in FIG. 5) being applied to the end of connecting member 165 below the horizontal pivot of support beam 80. Hence arms 72 and 74 begin to be lowered. The lowering of arms 72 and 84 continues as cylinder 180 is extended and as connecting member 165 is rotated counter-clockwise from its initial vertical position shown in FIG. 5 to the horizontal position shown in FIG. 3. The arc of travel of strut ball and socket connection 191 is shown at 195, in FIG. 2. Also as outwardly connecting member 165 is raised, inward connecting member 164 is similarly raised and swung from its depending position shown in FIG. 4 to its horizontal position shown in plan in FIG. 10. At a point in between, cam follower 194 at the end of inwardly connecting member 164 enters the bottom of camming channel 158 (see FIG. 8). Upon further extension of cylinder 180, cam follower 194 engages cam plates 156 and 154 and is constrained by them. Cam follower 194 is first prevented from further rearward motion by rear cam plate 156 and as it is raised, it is forced forward applying a supplementary counter clockwise rotational moment to beam 80 and causing further lowering of arms 72 and 74 (see dashed lines in FIG. 3). Because the counter clockwise rotational movement exerted by strut 190 is a trigonometric function, it becomes increasing less as forward connecting arm nears its horizontal position. However, at this point, the camming action on cam follower comes into being and assists the action of strut 190.

As mentioned above, the swinging force resulting from operation of cylinder 180 is applied through lever-hinge bracket 183 at a point thereto which is rearward and above the axis rotation thereof (i.e., of rotational axis A) (See FIGS. 4 and 10). Therefore, a force assisting the rotation of arms 72 and 74 is applied through lever-hinge bracket 183 to guide plate 187, which is located forward and below rotational axis A, and thence through bosses 188 and 189 thereof to the underside (as seen in FIG. 10) of connecting members 164 and 165, respectively.

Thus, it can be seen that support beam 80 is swung horizontal about a pivot in box swivel assembly 138 and is rotated about axis A through the action of a single hydraulic cylinder working in combination with other non-hydraulically affective means. In addition, so that only one hydraulic cylinder need be used to operate both grasping arms 72 and 74, hydraulic cylinder 180 extends through the orifices in arms 172 and 174 and through corresponding, concentric orifices in bearing hinge 178 such that hydraulic cylinder 180 drives through the axis of rotation of frame member 160.

With reference to FIG. 5, as mentioned above, bale engaging means 70 includes a bale grasping plate 86 pivotably mounted through a swinging link assembly 84 to the distal end of each grasping arm 72 and 74. Swinging link assembly 84 permits bale engaging means 70 to be useable with a plurality of bale diameters. In the embodiment depicted in FIG. 5, swinging link assembly 84 is comprised of a generally triangularly shaped link 198 having a first pivot 200 for rotatably mounting bale grasping plate 86 thereto and a second pivot 202 for being rotatably mounted to the terminal ends of bale grasping arm 72 or 74. Located near second pivot 202 at the terminal end of bale grasping arm 74 but spaced slightly inwardly thereof and located on the outward side of bale grasping arms 74 as depicted in FIG. 5 is a flange 204 having an orifice therein. A pair of orifices 206 are located in the lower corners of link 198. A locking bolt 208 when inserted through one of orifices 206 and the flange orifice coaxially aligned therewith, locks bale grasping plate 86 into either an upright position as shown in solid lines or a downward position as shown in dashed lines in FIG. 5, for the handling of larger or smaller bales, respectively.

As shown only in FIG. 3, a stabilizer wheel 210 can be provided at the forward end of trailer 30' to provide stability thereof when depositing the first bale or unloading the last bale. With trailer 30' unladen, stabilizer wheel 210 will preferably be approximately three inches above the ground and hence be out of the way during transporting of trailer 30.

Figure 13:
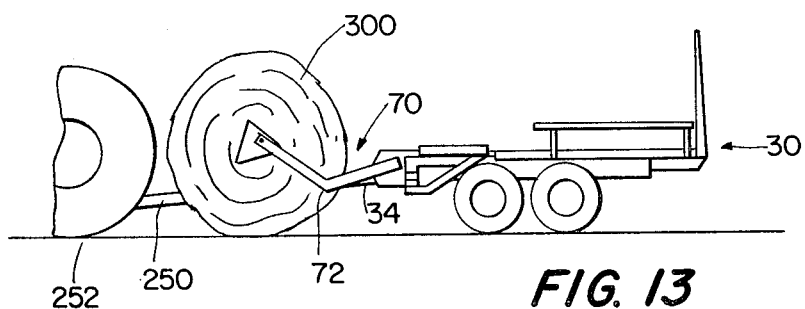
FIGS. 13–19 are schematic representations depicting the handling of a bale with the embodiment of the present invention depicted in FIG. 1. These figures respectively depict a ground supported bale being engaged, the bale being loaded onto the carriage assembly, a second bale being loaded onto the carriage assembly, the two previously loaded bales being shifted from the forward part of the carriage assembly to the rearward part by the tilting of the carriage assembly, loading the fourth bale, off loading all four bales in a stacked arrangement by pivoting the bed of the carriage assembly, and unrolling a bale to the side, such that, as the carriage assembly is moved forward the supporting wheels do not pass over the unrolled hay.

The operation of a bale handling apparatus according to the present invention in one embodiment for handling large round hay bales is depicted in FIGS. 13–19. In these figures, the present invention is embodied in trailer 30 which is connected by a yoke assembly 34 to the draw bar 250 of a tractor, only the large wheel of which is shown at 252. As seen in FIG. 13, bale engaging means 70 is in the engaging position and a hydraulic control valve 224 (not shown) is operated so as to supply pressurized fluid to the appropriate end of bale squeeze hydraulic cylinder 172 so as to first open up arms 72 and 74 such that bale grasping plates 86 can be placed on either end of a first ground supported hay bale 300 upon the forward movement of tractor 252. The control valve is then positioned so as to supply pressurized fluid to the other side of bale squeeze cylinder 172 and thereby engage grasping arms 72 and 74 with each end of hay bale 300.

Figure 14:
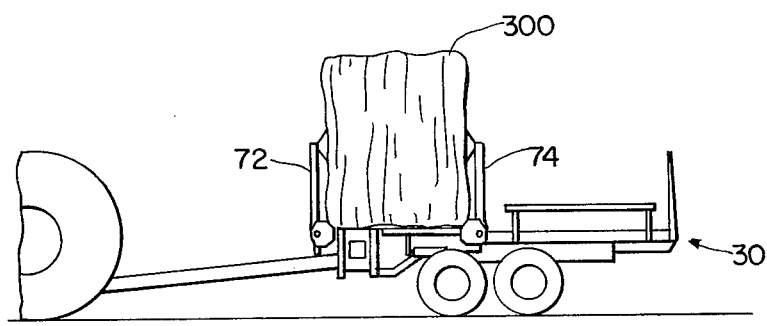

As soon as first hay bale 300 has been engaged with engaging means 70, a hydraulic control valve is operated so as to supply pressure to the appropriate side of bale lift and rotate cylinder 180 for the retraction thereof. As cylinder 180 begins to retract, because of camming action on roller 194 and of the interplay of strut 190 and guide plate 187, arms 72 and 74 are rotated vertically and swung horizontally so as to raise bale 300 to a second loading position at the near forward end of trailer 30. It has been assumed that lateral trolley 132 has been appropriately positioned so that bale 300 can be received. When bale 300 is positioned as shown in FIG. 14, arms 72 and 74 are over their pivot point so that upon the actuation of bale squeeze cylinder 172, bale 300 will be released into the appropriately positioned forward bale pan 52. As soon as bale 300 is located in pan 52, a hydraulic control valve is actuated so as to position the pan to the distal lateral side, thereby transferring a bale 300 to the far left side of trailer 30.

Figure 15:
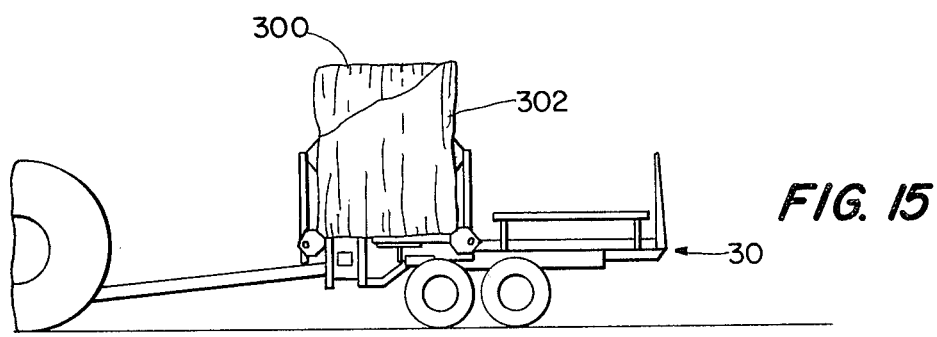
Figure 16:
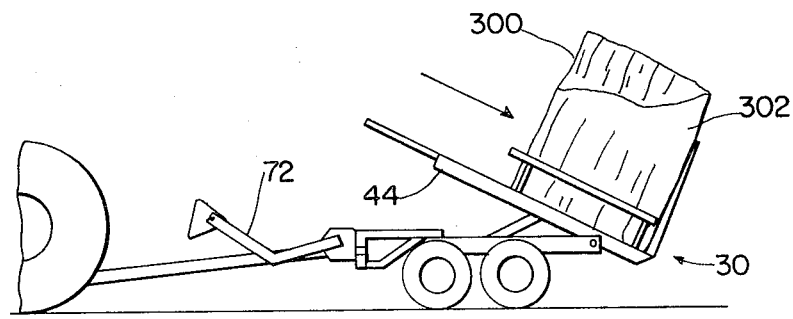
Figure 17:
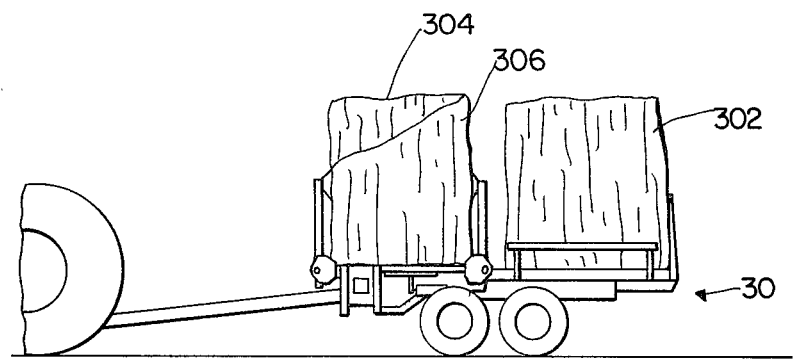
Figure 18:
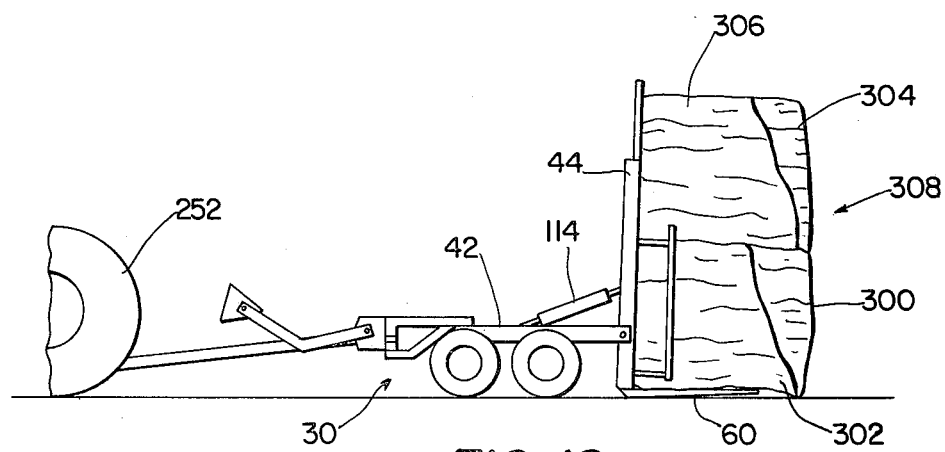

As soon as first hay bale 300 had been positioned to the other side of trailer 30, a second hay bale 302 can be loaded onto the near side of trailer 30, as shown in FIG. 15, using the same sequence of steps as described above. The two bales 300 and 302 are now in position to be moved to the rear of trailer 30. This is accomplished by bringing fork assembly 56, mounted on trolley 62 up to the back of bales 300 and 302. A hydraulic control valve is then actuated to supply pressurized hydraulic fluid to deck tipping cylinders 114 which in turn tilt bale support platform 44 to an angle well above the angle of response of the bales, as shown in FIG. 16. Bales 300 and 302 are then transferred by gravity to left rear bale pan 48 and right rear bale pan 50, respectively, movement being controlled by the fork assembly 56 which is moved hydraulically to the rear of the trailer 30. In this regard, it is noted that the hydraulic control valve is operated so that only the desired angle of tilt of support platform 44 is obtained.

The support platform 44 is then lowered and the aforementioned procedure is repeated to load two more bales, 304 and 306, onto the forward portion of trailer 30. The bales are then transported to the desired storage area whereupon the hydraulic control valve for the deck tipping cylinders 114 is again actuated, but this time for a sufficiently long enough period of time so that deck tipping hydraulic cylinders 114 extend all the way. This results in bale support platform 44 being rotated clockwise approximately 90°–95° until tines 60 rest on the ground. If trailer 30 is then pulled forward by tractor 252, a stack of four bales 308 will be formed. Obviously, a stack of bales can be loaded onto trailer 30 simply by reversing the aforementioned steps, reference being had to FIG. 18.

Figure 19:
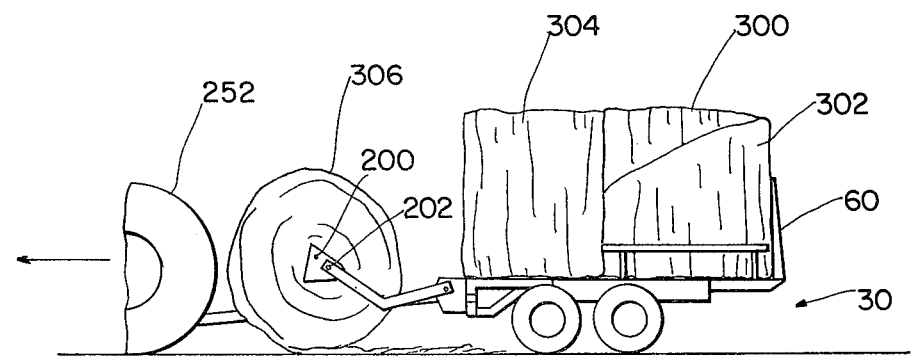

Finally, referring to FIG. 19, the bale handling apparatus according to the present invention can also unroll a bale of hay by off loading a bale, such as bale 306, and placing it on the ground forward of and along side of trailer 30. With bale engaging arms 72 and 74 still engaged with bale 306, grasping plate 86 rotates about first pivot 200. As soon as bale 306 has been unravelled, bale 304 can be off loaded and also unravelled. Thereupon, a control is actuated by the operator to admit pressurized fluid to the appropriate side of orbit motor 66. Orbit motor 66 thereupon moves longitudinal trolley 62 forwardly and with tines 60 in engagement with bales 302, they will be moved forward to the front of trailer 30. As mentioned above, longitudinal trolley 62 can be returned to its rearward position with springs as soon as the hydraulic pressure is released from orbit motor 66. Alternatively, orbit motor 66 can be positively driven to return longitudinal trolley 62 to its rearward position.

With reference now to FIGS. 20, 21 and 22, a second embodiment of the bale handling apparatus according to the present invention is depicted at 400 and which is designed to fit in the bed of a conventional pick-up truck, shown in dashed and dotted lines at 402. Apparatus 400 is comprised of bale engaging means 470 which is substantially similar to bale engaging means 70 depicted in FIGS. 2–6. Therefore, bale engaging means 470 will not be described further except to note that two hydraulic arm rotating cylinders 404 and 405 are utilized and are connected through a pivotal coupling 408 to a flange 410 which in turn is rigidly attached to support beam 480. Bale grasping arms 472 and 474 are substantially the same as arms 72 and 74 and are similarly mounted to the respective ends of support beam 480. In addition, it is noted that the arms-rotating hydraulic cylinder 580 also drives through the pivot axis of bale engaging means 470. This feature of driving through the pivot axis of bale engaging means 470 is important since it enables one cylinder 580 to be applied as the prime mover for both of the bale grasping arms 472, and 474, without restricting the angular rotation of arms 472 and 474, as would be the case if cylinder 580 were connected for example to the underside of bale engaging means 70.

The apparatus in addition to bale engaging means 470 is also comprised of an elongate frame 420 that is sized to fit in the bed of truck 402 and be attached thereto with means such as chains 422. Frame 420 is comprised of an angled base plate 424 having a large, flat, horizontally extending section 426 sized to fit between the wheelwells of the bed of truck 402 and a rear downward depending section 427 which engages the end of the bed of truck 402 and limits forward movement of frame 420. Frame 420 further comprises a forward vertical housing 428 for containing the hydraulic equipment depicted schematically therein. Frame 420 also provides a longitudinally extending track section which includes two parallel, spaced apart tracks 430.

Slidably mounted on tracks 430 is a bale receiving cradle 432, the forward end of which is attached to a hydraulically operated cylinder 434.

The operation of bale handling apparatus 400, once it has been loaded and secured to a pick-up truck 402, is relatively simple. Truck 402 is backed up to a round hay bale disposed on the ground and arms 472 and 474 are rotated apart to the dashed position shown in FIG. 22 by supplying pressurized hydraulic fluid to the appropriate side of bale squeezing cylinder 580. Then, bale rotating cylinders 404 and 406 are supplied with presurized hydraulic fluid to the appropriate side thereof so as to rotate support beam 480 and arms 472 and 474 to a position such as shown in dashed lines in FIG. 21. When the height of grasping plates 86 has been adjusted with cylinders 404 and 406, cylinder 580 is extended and arms 472 and 474 engage the round hay bale. Cylinders 404 and 406 are then actuated to rotate support beam 480 counterclockwise as shown in FIG. 21 and position the hay bale on cradle 432. After actuating hydraulic cylinder 434 to position the hay bale to the forward position as shown in FIG. 21, a second hay bale can be loaded in a similar manner and rest on a stationary, supporting cradle 440. However, because of the smallness of the bed of truck 402, the second bale cannot be fully loaded thereon and consequently, arms 472 and 474 will have to remain engaged with the second hay bale as it is being transported.

Finally, it is noted that the hay bale can be unrolled in much the same way as the apparatus depicted in FIGS. 2-6, namely by placing a hay bale on the ground and with bale grasping plates 86 still engaged, driving truck 402 in the forward direction, thereby permitting the hay bale to unroll.

Although the present invention has been described with respect to presently preferred embodiments thereof, it should be obvious to those skilled in the art that the scope and spirit of the present invention covers obvious modifications thereto.

For example, the apparatus according to the invention could be utilized to grasp the bales across their diameter, thus permitting the bales to be loaded onto the trailer frame with the longitudinal axis of the bale installed transversally of the frame.

Alternatively, tilting of the frame with respect to the supporting chassis could be affected about the longitudinal axis of the chassis so as to permit side stacking of a plurality of bales.

Furthermore, by hinging the tines mounted on the back of the frame, bales could be slid off the rear of the trailer upon tilting of same about the transverse axis of the chassis.

Accordingly, this description is to be construed as illustrative only and is for the purpose of teaching those skilled in the art the manner of carrying out the invention.

We claim:

1. A bale handling apparatus comprising:
    an elongate main frame having front and rear ends and capable of holding a plurality of longitudinally arranged bales:
    means for movably supporting said frame over the ground;
    bale engaging means for releasably engaging a bale and for loading and unloading the engaged bale respectively onto and off said frame at one end thereof; and
    tilting means having a transverse axis of rotation and for tilting said frame with respect to said supporting means about said transverse axis such that a bale loaded onto said one end of said frame can be slid to the other end of said frame so that a second bale can be loaded onto said frame at said one end thereof;
    wherein said frame is also capable of holding a plurality of bales in a transverse arrangement;
    said apparatus further comprising a cradle movably mounted on said frame; and
    means for moving said cradle transversely with respect to said frame, said bale engaging means also being capable of loading and unloading the engaged bale, respectively, onto and off said cradle.

2. A bale handling apparatus as claimed in claim 1 wherein said frame further includes an elongate bed for holding the bales and tines mounted substantially perpendicularly with respect to said bed at the rearward end thereof; wherein said bale engaging means loads and unloads a bale at the forward end of said frame and bed; and wherein said tilting means can pivot said frame such that said forward end thereof can be elevated above said rear end thereof to a position that is substantially perpendicular with respect to the ground and said supporting means; whereby a plurality of previously loaded bales can be off loaded into a stacked arrangement or a plurality of previously stacked bales can be engaged at the bottom of the stack by said tines upon rearward movement of said apparatus and the stack of bales can be loaded onto said frame.

3. A bale handling apparatus as claimed in claim 2 wherein said bale engaging means is also for securely, releasably grasping a bale and comprises two, spaced apart bale grasping arms; first means for moving said arms relative to one another for grasping and releasing the bale; and second means for vertically pivoting said arms about a substantially horizontal axis such that in a first position said arms can grasp a bale that is supported on the ground, and such that said arms can be pivoted to a second position whereat the bale can be released and deposited onto said frame upon releasing actuation of said arms moving means.

4. A bale handling apparatus as claimed in claim 3 wherein said apparatus further includes;
    third means for horizontally pivoting said arms about a substantially vertical axis located at the forward end of said frame such that in an engaging position said arms extend in a longitudinal direction and are spaced from one side of said frame, and such that said arms can be pivoted to a loading position where said arms extend in a transverse direction; and
    an arm support frame pivotably mounted at one inner end portion thereof to said elongate main frame for swinging about said vertical axis and for rotation about said horizontal axis, said arm support frame pivotably supporting said arms in said spaced apart relationship for movement relative to each other and supporting said first means for moving said arms;

and wherein said first means for moving said arms comprises an extensible hydraulic motor means supported by said frame member for extension along said horizontal axis.

5. A bale handling apparatus as claimed in claim 4 wherein said second and said third means are operably connected to said arm support frame and wherein said third means comprises a cam and a cam follower, one of which is fixedly mounted on said main frame the other of which is mounted on said arm support frame.

6. A bale handling apparatus as claimed in claim 5 wherein said cam follower is rigidly attached to said arm support frame at said one end portion thereof at a location spaced inside from the operable connection of said second means and wherein said cam is comprised of two spaced apart substantially vertically mounted cam plates defining a camming channel therebetween which is open at the bottom thereof for receiving said cam follower as said arm support frame is swung.

7. A bale handling apparatus as claimed in claim 5 and further including a strut member pivotably connected between said main frame and said arm support frame, and being connected to said arm support frame at a location outside of the location where said second means is operably connected thereto.

8. A bale handling apparatus as claimed in claim 1 or 2 wherein said apparatus further includes means for pivotably supporting and moving said bale engaging means about a substantially vertical axis located at the forward end of said frame and for lifting a bale from a ground supporting surface to said frame such that in a first bale retrieving position said bale engaging means can retrieve a bale located at a position laterally spaced from the forward side portion of said frame and such that in a second, bale loading position the bale is lifted above the ground supporting surface and can be released and deposited onto the forward side portion of said frame, said pivotably supporting and moving means comprising a cam and a cam follower, one of which is fixedly mounted on said main frame and the other of which is fixedly mounted on said bale engaging means.

9. A bale handling apparatus as claimed in claim 1 wherein said bale engaging means comprises an elongate arm support frame, two spaced apart bale grasping arms, each arm being pivotably mounted at a pivot thereof that is spaced from the proximal end thereof to said arm support frame, first and second means for pivotably mounted said arm support frame at one inside end portion thereof to said main frame for movement about a generally vertical axis and a generally horizontal axis, said axes being spaced apart, and a first extensible hydraulic motor for pivotably moving the distal ends of said arms away and toward each other and connected between the proximal end portions of said arms between the pivot of said arms and the proximal end thereof and said first motor extending along said horizontal axis; and said apparatus further comprising means for moving said arm support frame about said axes from a first bale loading position whereat said arm support frame extends generally parallel and adjacent to the side of said main frame and said arms are raised above the side of said main frame such that a bale engaged thereby can be deposited on said main frame or can be retrieved from said main frame to a second bale receiving position whereat said arm support frame extends laterally from and generally perpendicular to said main frame and said arms are lowered to a position to grasp a bale situated laterally spaced from said frame movably supporting means, said arm support moving means comprising:

a single, second extensible hydraulic motor pivotably connected to said main frame at one end thereof and pivotably connected to said arm support frame at a first location which is on said horizontal axis and on a perpendicular line with said vertical axis, and mechanical guide elements which comprise a disengagable cam and cam follower, one of which is mounted on said main frame and the other of which is mounted on said arm support frame at a second location thereon which, when said cam and cam follower are engaged is inside of said vertical axis and is spaced from said horizontal axis on the side of said vertical axis, and a universally pivoted strut mounted between said main frame at a third location which is on the vertical axis side of said horizontal axis.

10. Round bale handling apparatus comprising:

a mobile unit having a bed for supporting at least one round bale; and a bale handling assembly for lifting and loading bales from the ground onto said bed, said bale handling assembly comprising a framework including means for releasably engaging a bale;

means pivotably coupling said framework to said mobile unit for pivotal movement about a generally vertical axis and a generally horizontal axis such that pivotal movement about the vertical axis moves the framework laterally outwardly from or inwardly adjacent the mobile unit, and pivotal movement about the horizontal axis raises and lowers said bale engaging means;

a linear actuator coupled to said mobile unit and to said framework, and mechanical guide elements coupled to said mobile unit and said framework for effecting the following movements of said framework and said bale engaging means under the force of said linear actuator: from an initial bale receiving position in which the framework extends laterally outwardly from the mobile unit and said bale engaging means is positioned to grasp a bale lying laterally adjacent the mobile unit, the framework pivots about said two axes to a bale depositing position in which said framework lies along and adjacent said mobile unit with said bale engaging means disposed upwardly such that a bale engaged thereby lies above said bed, and vice versa.

11. A bale handling apparatus as claimed in claim 10 wherein said horizontal pivot axis and said vertical pivot axis are spaced apart and wherein said mechanical guide elements comprise a cam and a cam follower mounted respectively on said mobile unit and said framework on the vertical pivot axis side of said horizontal pivot axis, and a universally pivoted strut coupled at one end to said mobile unit and at the other end to said framework on the vertical pivot axis side of said horizontal pivot axis.

12. A bale handling apparatus as claimed in claim 10 wherein said bed is pivotally mounted to said mobile unit, said apparatus further including means for tilting said bed for unloading any previously loaded bale.

13. Round bale handling apparatus comprising a mobile unit having an elongate bed for supporting at least two round bales, a cradle movably mounted on said bed, and means for moving said cradle from a one end of said bed where a bale is loaded thereon to the other end of said bed where said bale can be retained so that a second bale can be loaded at said one end of said bed; and a bale handling assembly for lifting and loading bales from the ground onto said bed at one end thereof, sad bale handling assembly comprising a frame including two spaced apart, pivotably mounted, counterlevered grasping arms for releasably grasping a bale therebetween at the distal ends thereof, means for pivoting said arms between a bale grasping position and a bale releasing position, said arm pivoting means comprising a linear actuator coupled between the proximal ends of said arms at the proximal terminal end sides of the pivots thereof, and means for pivotably mounting said frame about a generally horizontal axis to said mobile unit, and means for pivoting said frame about said horizontal axis, and mounting means for mounting said linear actuator to said frame through said frame mounting means and on said horizontal axis.

14. A bale handling assembly as claimed in claim 13 wherein said linear actuator is a single hydraulic cylinder which drives said arms through said frame mounting means.

15. A bale handling assembly as claimed in claim 13 wherein said bale handling assembly further includes adjustable bale grasping means mounted at said arm distal end, said bale engaging means comprising a bale grasping member, a swing link assembly, having a swing link, a first pivot for pivotably mounting said swing link to said arm distal end, a second pivot spaced from said first pivot for pivotably mounting said swing link to said grasping member, and means for changably locking said swing link at a plurality of positions to said arm distal end so that the radius of said grasping member from said horizontal pivot axis can be changed and hence bales of different diameters can be accommodated.

* * * * *